3,330,837
SUBSTITUTED HYDRAZINE DERIVATIVES AND
PROCESS FOR THE MANUFACTURE THEREOF
Werner Bollag, Basel, Hugo Gutmann, Reinach, Basel-Land, Balthasar Hegedüs, Binningen, Ado Kaiser, Neu-Frenkendorf, Albert Langemann, Basel, Marcel Müller, Reinach, Basel-Land, and Paul Zeller, Allschwil, Switzerland, assignors to Hoffmann-La Roche Inc., Nutley, N.J., a corporation of New Jersey
No Drawing. Filed July 10, 1962, Ser. No. 208,952
Claims priority, application Switzerland, July 14, 1961, 8,271/61
1 Claim. (Cl. 260—296)

This application relates to novel hydrazine compounds useful as cytostatic agents. More particularly, the novel compounds in this invention are selected from the group consisting of compounds of the formula

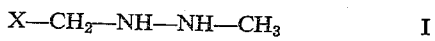    I wherein X is a mono or polynuclear oxygen, nitrogen and/or sulfur containing heterocyclic residue which can be substituted by one or more substituents selected from the group consisting of alkyl, trifluoromethyl, halogen, cyano, hydroxy, esterified or etherified hydroxy, mercapto, alkylthio, amino, acylamino, ureido, (alkylsulfonyl)-amino, guanidino, amidino, aminoalkyl, carbamoyl, allophanoyl, sulfamoyl, alkylsulfonyl, nitro, (2-methylhydrazino)-methyl, acyl and phenyl, and pharmaceutically acceptable acid addition salts thereof.

The mono or polynuclear heterocyclic groups comprehended by Formula I can be exemplified by the following: 5-membered heterocyclic rings with one or more hetero atoms, such as pyrrole, pyrazole, imidazole, thiazole, furan, thiophene, oxazole, isoxazole, isothiazole, or a 6-membered heterocyclic ring with one or more hetero atoms, such as pyridine, pyridazine, pyrimidine, pyrazine, triazine, tetrazine, pyran, dioxan, oxazine; or a polynuclear radical with a 5-membered heterocyclic component, such as indole, coumarone, thionaphthene, dibenzofuran, carbazole, benzimidazole, or a polynuclear radical with a 6-membered heterocyclic component, such as quinoline, cinnoline, acridine, xanthene, thioxanthene, or the like.

The various substituents which can be borne by the heterocyclic moieties comprehended by R in Formula I above are, for example:

Lower alkyl groups, such as methyl, ethyl, isopropyl; trifluoromethyl;

Halogen atoms such as fluorine, chlorine, bromine, iodine; cyano;

Hydroxy and esterified (for example, with lower alkanoic acids such as acetic acid and aralkanoic acids such as benzoic acid) and etherified (for example, with lower alkyl, lower alkenyl and ar-lower alkyl groups) hydroxy, for example, acetoxy, benzoyloxy, methoxy, allyloxy and benzyloxy: mercapto and lower alkylthio, for example, methylthio and butylthio;

Primary, secondary and tertiary amino groups such as amino, lower alkylamino, for example, methylamino, and di-lower alkylamino, for example, dimethylamino, diethylamino;

Acylamino groups wherein the acylating moiety can be formed from aliphatic, aromatic or heterocyclic acids and the amino group of which can be primary or secondary such as lower alkanoylamino groups, for example, N-acetyl-N-methylamino, acetylamino and pivaloylamino; acylamino groups wherein the acyl moiety is the residue of a naturally occurring α-amino acid, for example, alanylamino; other aliphatic acylamino groups, for example, succinimido; aroylamino groups, for example, benzoylamino and phthalimido; heterocyclic acylamino groups wherein the hetero moiety is a one to two hetero atom nitrogen and/or oxygen containing 5 to 6 membered heterocyclic ring as well as heterocyclic acylamino groups wherein the heterocyclic ring bears further substituents such as lower alkyl, for example, nicotinoylamino, isonicotinoylamino, (methylisoxazolylcarbonyl)-amino and (methyloxazolylcarbonyl)-amino;

Ureido groups, the hydrogen atoms of which can be in part or completely replaced by saturated or unsaturated aliphatic, cycloaliphatic, araliphatic, aromatic or heterocyclic radicals which themselves can bear further functional groups, for example, methylureido, isopropylureido;

(Alkylsulfonyl)-amino groups, for example, (methylsulfonyl)-amino;

Guanidino groups, the hydrogen atoms of which can be in part or completely replaced by saturated or unsaturated aliphatic, cycloaliphatic, araliphatic, aromatic or heterocyclic radicals which themselves can bear further functional groups, for example, methylguanidino, isopropylguanidino, (hydroxyethyl)-guanidino;

Amidino groups, the hydrogen atoms of which can be in part or completely replaced by saturated or unsaturated aliphatic, cycloaliphatic, araliphatic, aromatic or heterocyclic radicals which themselves can bear further functional groups, for example, methylamidino, diisopropylamidino, cyclopropylamidino, phenylamidino, benzylamidino, isoxazolylamidino and (hydroxyethyl)-amidino;

Primary, secondary and tertiary amino-lower alkyl groups, for example, aminomethyl, aminoethyl, aminopropyl, methylaminomethyl, ethylaminoethyl, methylaminopropyl, dimethylaminomethyl, diethylaminoethyl and dimethylaminopropyl;

Carbamoyl groups, the hydrogen atoms of which can be replaced by saturated or unsaturated aliphatic or alicyclic radicals which themselves can bear further functional groups or aromatic or heterocyclic radicals, for example, mono and dialkylcarbamoyl such as N-methylcarbamoyl, N,N-dimethyl carbamoyl, N-isopropylcarbamoyl, N-isobutylcarbamoyl, N-tert.-butylcarbamoyl, N,N-diisopropylcarbamoyl, N-tert.-amylcarbamoyl, N-tert.-octylcarbamoyl; as well as N-alkoxyalkylcarbamoyl groups such as methoxyethylcarbamoyl; N-hydroxyalkylcarbamoyl, such as hydroxyethylcarbamoyl; N-alkylthioalkylcarbamoyl groups such as methylthioethylcarbamoyl; N-carbamoyl-alkylcarbamoyl groups such as carbamoylmethylcarbamoyl; N-alkylsulfonylalkylcarbamoyl groups such as methylsulfonylethylcarbamoyl; N-haloalkylcarbamoyl groups such as β-chloroethylcarbamoyl and β,β,β-trifluoroethylcarbamoyl; N-alkenylcarbamoyl groups such as N-allylcarbamoyl; N-aralkylcarbamoyl groups such as benzylcarbamoyl; N-furfurylcarbamoyl; N-cycloalkylcarbamoyl groups such as N-cyclopropylcarbamoyl; N-alkylaminoalkylcarbamoyl and N-dialkylaminoalkylcarbamoyl groups such as β-methylaminoethylcarbamoyl and diethylaminoethylcarbamoyl; and N,N-alkylenecarbamoyl groups such as N,N-tetramethylenecarbamoyl and N,N-pentamethylenecarbamoyl;

Allophanoyl groups, the hydrogen atoms of which can be in part or completely replaced by saturated or unsaturated aliphatic, cycloaliphatic, araliphatic, aromatic or heterocyclic radicals which themselves can bear further functional groups, for example, 4-methylallophanoyl, 2-isopropylallophanoyl;

Sulfamoyl groups, the hydrogen atoms of which can be substituted by alkyl groups such as lower alkyl groups, for example, N,N-dimethylsulfamoyl;

Lower alkylsulfonyl groups, for example methylsulfonyl; nitro;

(2-methylhydrazino)-methyl;

Acyl radicals of lower aliphatic carboxylic acid, for example formyl, acetyl and propionyl, and of aromatic carboxylic acids, for example, benzoyl;

Phenyl radicals, either unsubstituted or bearing one of the above-named substituents, for example, (2-methyl-hydrazinomethyl)-phenyl, carbamoylphenyl and acylaminophenyl such as [(5-methyl-3-isoxazolylcarbonyl)-amino]-phenyl and ureidophenyl.

Some preferred compounds within the scope of Formula I above are classifiable into subgenera as represented by the following formulae:

Pyridine derivatives having the formula

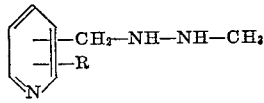

II wherein R represents carbamoyl, allophanoyl, acylamino or ureido, e.g. 1-methyl-2-[5-(isopropylcarbamoyl)-2-picolyl]-hydrazine, 1-methyl-2-[5-(allophanoyl)-2-picolyl]-hydrazine; 1-methyl - 2 - [5 - (5 - methylisoxazolylcarbonyl) - amino-2-picolyl]-hydrazine, 1-methyl-2-(5-ureido-2-picolyl)-hydrazine;

Thiophene derivatives having the formula

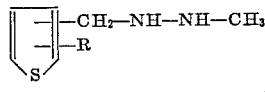

III wherein R represents carbamoyl, allophanoyl, acylamino or ureido, e.g. 1-methyl-2-[5-(isopropylcarbamoyl)-2-thenyl]-hydrazine, 1-methyl-2-(5-allophanoyl-2-thenyl)-hydrazine; 1-methyl-2-[5 - (5 - methyl-isoxazolcarbonyl) - amino - 2-thenyl]-hydrazine, 1-methyl-2-(5-ureido-2-thenyl)-hydrazine;

Isoxazole derivatives having the formula

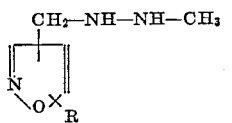

IV wherein R represents carbamoyl, allophanoyl, acylamino or ureido, e.g. 3-isopropylcarbamoyl-5-(2-methylhydrazinomethyl)-isoxazole, 3-allophanoyl-5-(2 - methylhydrazinomethyl) - isoxazole, 3 - (5 - methylisoxazolcarbonyl)-amino-5-(2-methyl-hydrazinomethyl)-isoxazole, 3-ureido-5-(2-methylhydrazinomethyl)-isoxazole.

The compounds of Formula I can be prepared by reacting a compound of the formula $$CH_3—NH—NH_2 \quad V$$

wherein the hydrogen atoms of the hydrazine group may partially be substituted by protecting groups such as acyl, carbalkoxy, carbobenzoxy or benzyl, with a compound yielding the moiety

VI wherein X' has the same meaning as X or is a substituent convertible into a substituent represented by X in Formula I;

or by methylation of a compound of the formula

VII wherein X' has the same meaning as indicated above and the hydrogen atoms of the hydrazine group may partially be substituted by protecting groups such as acyl, carbalkoxy, carbobenzoxy or benzyl;

if necessary converting the moiety X' in the resulting hydrazine into a moiety represented by X; if necessary splitting off such protecting groups as are present; and if desired converting the so-obtained product of Formula I into a salt.

One embodiment of the invention consists of reacting methylhydrazine or a methylhydrazine, the nitrogen atoms of which are partially substituted by protecting groups, with an agent yielding the residue X'—CH$_2$—. This reaction can be effected, for example, by use of the following reagents:

2-(chloromethyl)-thiophene,
2,5-bis-(chloromethyl)-thiophene,
3-(bromomethyl)-thiophene,
3,4-bis-(chloromethyl)-2,5-dimethyl-thiophene,
5-(chloromethyl)-thiophene-2-carboxylic acid methylester,
5-(chloromethyl)-2-bromo-thiophene-3-carboxylic acid methylester,
5-(chloromethyl)-2-chlorothiophene,
5-(chloromethyl)-2-acetyl-thiophene,
5-(chloromethyl)-2-acetamido-thiophene,
5-(chloromethyl)-2-cyano-thiophene,
5-(chloromethyl-2-nitro-thiophene,
2-(chloromethyl)-furan,
2,5-bis-(chloromethyl)-furan,
5-(chloromethyl)-furan-2-carboxylic acid methylester,
5-(chloromethyl)-2-carbamoyl-furan,
5-(chloromethyl)-2-cyano-furan,
2-(chloromethyl)-pyridine,
3-(chloromethyl)-pyridine,
4-(chloromethyl)-pyridine,
6-(chloromethyl)-pyridine-3-carboxylic acid ethyl ester,
6-(chloromethyl)-3-cyano-pyridine,
2-(chloromethyl)-pyrazine,
5-methyl-3-(chloromethyl)-isoxazole,
3,5-dimethyl-4-(chloromethyl)-isoxazole,
5-(chloromethyl)-isoxazole-3-carboxylic acid methyl ester,
4-(chloromethyl)-oxazole-3-carboxylic acid methyl ester and the like. When using a dihalo compound as reagents it is convenient to use two moles of methylhydrazine, thereby forming compounds bearing two methylhydrazino groups.

It is suitable in order to effect reaction with a compound of Formula VI to first convert the hydrazine compound of Formula V above into a salt, preferably via treatment with an alkali metal alcoholate in an alcoholic solution. After removal of the alcohol, the resulting salt is advantageously dissolved in an inert solvent, for example, dimethylformamide, and treated with an X'—CH$_2$— yielding agent, preferably at an elevated temperature. The reaction product can be purified by conventional methods, for example, via extraction, crystallization or distillation.

The introduction of the X'—CH$_2$— moiety can also be effected by a reaction of methylhydrazine or methylhydrazine partially substituted by protecting groups, for example, 1-methyl-1-acetyl-hydrazine with a carbonyl compound, followed by reduction of the so-formed hydrazone, as well as eventual splitting off of the protecting groups. This reaction can suitably be effected via a short heating of the reaction components in a solvent, such as, for example, alcohol, and reduction of the resulting hydrazone in the presence of a hydrogenation catalyst, such as palladium or platinum.

According to a further variation of the reaction, there is reacted with an agent yielding the moiety X'—CH$_2$— a compound of the formulae

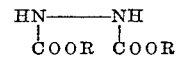 VIII

 IX wherein R represents lower alkyl, which has been methylated. Following this reaction, the carbalkoxy substituents are split off. The introduction of the X'—CH₂— moiety can be undertaken in the same manner as previously described.

According to another embodiment of the invention, hydrazine compounds of Formula VII are methylated. This methylation can be conducted, for example, with the help of a methylating agent, such as, methyliodide or dimethylsulphate, under the conditions previously described for the introduction of the radical X'—CH₂—.

The introduction of the methyl group can also be effected via reaction of a compound of Formula VII above with formaldehyde, followed by reduction of the condensation product. Condensation is suitably effected with equimolar amounts of the hydrazine of Formula VII and of the formaldehyde. The hydrogenation of the condensation product can proceed simultaneously with the condensation reaction or subsequent thereto. Advantageously, it is conducted in the presence of a hydrogenation catalyst, such as platinum or palladium, until the absorption of an equimolar amount of hydrogen. The working up of the reaction mixture can be effected by conventional means, for example, via fractional distillation.

Products of Formula I above can also be obtained via methylation of a product obtained via reaction of a compound of Formula VIII or IX above with a compound yielding the moiety X'—CH₂—.

Any protecting groups present in the reaction products can be split off according to known procedures.

Where necessary, the conversion of the moiety X' into the moiety X can be effected in the above described reaction procedures at any point of time. Thus, it is advantageous, for example, to prepare substituted carbamoyl compounds from heterocyclic acids, e.g. 5-[(2-methyl-1,2-dicarbobenzoxy-hydrazino)-methyl]-thiophene - 2 - carboxylic acid, itself obtained by saponification of corresponding methyl or ethyl esters, via reaction with amines in accord with known methods of amidation. Suitably, the acid is converted into a reactive derivative, for example, into an acid chloride or a mixed anhydride, for example with a carbonic acid monoester or into an activated ester, for example, a cyanomethylester. The acid can also be amidated directly via use of a condensation agent such as dicyclohexylcarbodiimide. The above-mentioned amides can also be obtained in the presence of a strong acid from cyano compounds e.g. 5[(2-methyl-1,2-dicarbobenzoxy-hydrazino)-methyl]-2-cyano-thiophene via reaction with olefins, for example, isobutylene or secondary or tertiary alcohols. Hydrolysis of the nitriles by means of strong acids or with hydrogen peroxide and alkalis produces N-unsubstituted amides. Protecting groups are subsequently removed from carbamoyl compounds obtained according to this method via hydrogenolysis or treatment with a hydrogen bromide/glacial acetic acid solution. The resulting hydrobromides obtained by the latter method can, if desired, be converted into corresponding free bases and/or into other salts.

The acylamino substituted compounds of the inventiion are preferably prepared via acylation of an appropriate amino compound which itself, for example, can be obtained via reduction of the corresponding nitro or azo compound. The acylation can be effected, for example, by use of a reactive derivative of the desired carboxylic acid or sulfonic acid, or from the free acid by use of a condensation agent such as dicyclohexylcarbodiimide. The subsequent removal of the protecting groups can be effected in ways known per se; for example, via hydrogenolysis or hydrolysis with hydrogen bromide in glacial acetic acid. Accessible from the same intermediate amino compounds are ureido compounds via treatment with cyanates or isocyanates, as well as guanidines by treatment with cyanamide and its derivatives (for example, methylisothiourea sulphate).

Amidino or substituted amidino compounds of Formula I are advantageously prepared from heterocyclic nitriles with methylhydrazinomethyl-substituents, the hydrazine group of which is substituted by protecting groups, via the corresponding imido ether, which can be obtained via reaction of the nitrile with alcohol and mineral acid. By reaction of the imido ether with ammonia or a primary or secondary amine, the desired amidino compound is obtained. Suitably protected heterocyclic nitriles can also be reacted directly with salts of amines, for example, isopropylamine hydrochloride or isopropylamine tosylate at elevated temperatures, and the desired products of Formula I can be obtained via subsequent removal of the protecting groups. One further method consists of converting a mono-substituted heterocyclic methyldrazinomethylamide, the hydrazine group of which is substituted by protecting groups via reaction with a phosphorus halide, for example, phosphorus pentachloride, into corresponding imido halides, which then, in turn, can be reacted with ammonia, primary, or secondary amines, whereby there is obtained upon removal of the protecting groups, amidines and mono- or disubstituted amidines.

The substituted heterocyclic hydrazine compounds of Formula I from pharmaceutically acceptable acid addition salts with both pharmaceutically acceptable inorganic and organic acids, such as, for example, hydrohalic acids, as hydrogen chloride, hydrogen bromide, hydrogen iodide, as well as other mineral acids, such as sulfuric acid, phosphoric acid, nitric acid, and with organic acids, such as tartaric acid, citric acid, oxalic acid, camphorsulfonic acid, ethanesulfonic acid, toluenesulfonic acid, salicylic acid, ascorbic acid, maleic acid, mandelic acid, and the like. Preferred salts are the hydrohalides, especially the hydrochloride. The acid addition salts can suitably be prepared via treatment of the hydrazine derivative in an inert solvent with the corresponding acid.

The compounds of Formula I are active cytostatic agents. They inhibit the growth of transplantable tumors in both mice and rats. Thus, they are active, for example, against Walker tumors, Erlich carcinoma, Erlich ascites carcinoma, and the like. Also these compounds cause decomposition of macromolecular desoxyribonucleic acid in solution. The compounds can be administered internally in the form of conventional pharmaceutical preparations, for example, the bases of Formula I or their pharmaceutically acceptable acid addition salts can be administered in conventional enteral or parenteral pharmaceutical excipients containing organic and/or inorganic inert carriers, such as water, gelatin, lactose, starch, magnesium stearate, talc, plant oils, gums, alcohol, Vaseline, or the like. The pharmaceutical preparations can be in conventional solid forms, for example, tablets, dragées, suppositories, capsules, or the like, or conventional liquid forms, such as suspensions, emulsions, or the like. If desired, they can be sterilized and/or contain conventional pharmaceutical adjuvants, such as, preservatives, stabilizing agents, wetting agents, emulsifying agents, buffers, or salts used for the adjustment of osmotic pressure. The pharmaceutical preparations can also contain other therapeutically active materials.

The following examples are illustrative, but not limitative of the invention. All temperatures are in degrees centigrade.

*Example 1*

A solution of 50.8 g. of 1-methyl-1,2-dibenzoyl-hydrazine in 100 ml. of dimethylformamide was added dropwise, with stirring and slight cooling to 20–20°, to a suspension of 4.8 g. of sodium hydride in 100 ml. of dimethylformamide. A solution of 23.3 g. of 2-(chloromethyl)-furan in 35 ml. of dimethylformamide was then added thereto, and the resulting solution permitted to stand overnight at room temperature. The greater part of the dimethylformamide was then distilled off under reduced pressure and the residue poured into 1 N sodium hydroxide solution, extracted with ether, the extract washed with 1 N sodium hydroxide and water, dried over sodium sulfate and evaporated, yielding crystals of 1- methyl-2-(2-furfuryl)-1,2-dibenzoyl-hydrazine melting at 92–95°.

44 g. of this product in 430 ml. of ethanol was boiled under a nitrogen atmosphere for 15 hours with a solution of 70 g. of potassium hydroxide in 60 ml. of water. The reaction mixture was then concentrated under reduced pressure, the concentrate sautrated with potassium hydroxide, diluted with ether and the precipitated potassium benzoate separated. After separation of the aqueous potassium hydroxide solution, the ether phase was dried over potassium hydroxide, filtered and evaporated. The residual 1-methyl-2-(2-furfuryl)-hydrazine was purified via distillation, yielding a colorless oil boiling at 67–68°/10 mm. Hg.

Via treatment of this so-obtained base in acetonitrile with an equivalent amount of p-toluene sulfonic acid, there was obtained, upon recrystallization from acetonitrile/ether, the tosylate, which melted at 76–77°.

Example 2

51 g. of 1-methyl-1,2-dibenzoyl-hydrazine was added to a solution of 4.6 g. of sodium in 150 ml. of absolute ethanol. The solvents were removed under reduced pressure and the residue suspended in 150 ml. of dimethylformamide. 17 g. of 2,5-bis(chloromethyl)-furan was added to this suspension with stirring. The reaction mixture was then heated to 30–45°. Following a further temperature increase, the temperature of the reaction mixture was held for one hour at 90°, and then most of the dimethylformamide was evaporated under reduced pressure, the residue taken up in water, and extracted with methylene chloride. The methylene chloride phase was then washed twice with dilute sodium hydroxide, dried over sodium sulfate and evaporated. The residual dark oil was purified via adsorption on aluminum oxide, followed by elution with acetone/ether. Via crystallization from ether there was obtained 2,5-bis-[(2-methyl-1,2-dibenzoyl-hydrazino)-methyl]-furan, melting at 115–120°.

33 g. of this compound was heated for 8 hours under reflux with a solution of 50 g. of potassium hydroxide in 50 ml. of water and 350 ml. of ethanol. The reaction mixture was then concentrated to dryness under reduced pressure, the residue extracted with ether, dried over sodium sulfate and evaporated. The residual 2,5--bis-[(2-methylhydrazino)-methyl]-furan was purified via distillation under reduced pressure, and boiled at 130–135°/1.5 mm. Hg.

Example 3

110 g. of 1-methyl-1,2-dibenzoyl-hydrazine was added to a solution of 10 g. of sodium in 500 ml. of absolute ethanol and then, in the course of ½ hour and at the boil, 58 g. of 2-(chloromethyl)-thiophene was added to the reaction mixture. The resulting mixture was heated for 2 hours under reflux. After it cooled down, the precipitated sodium chloride was separated, the filtrate concentrated under reduced pressure and the residue taken up in ether and sodium hydroxide. The ether phase was extracted several times with 1 N sodium hydroxide and water, and then dried over sodium sulfate. The solvents were then evaporated off, yielding 1-methyl-2-(2-thenyl)-1,2-dibenzoyl-hydrazine as crystals melting at 116–118°.

A solution of 42 g. of this intermediate product in 415 ml. of ethanol was heated for 6 hours under a nitrogen atmosphere and under reflux with a solution of 65 g. of potassium hydroxide in 58 ml. of water. The solvents were distilled off under reduced pressure and the residue treated until saturated with solid potassium chloride, diluted with ether, and the so-precipitated potassium benzoate separated. After separation of the aqueous potassium hydroxide solution, the ether phase was dried over potassium hydroxide, filtered and the filtrate evaporated. The residual 1-methyl-2-(2-thenyl)-hydrazine was purified via distillation, and formed a colorless oil which boiled at 96–98°/11 mm. Hg.

Treatment of this product with an equivalent amount of p-toluenesulfonic acid in acetonitrile, followed by recrystallization from acetonitrile-ether, yielded the tosylate, which melted at 113–114°.

Example 4

A solution of 63.5 g. of 1-methyl-1,2-dibenzoyl-hydrazine in 160 ml. of dimethylformamide was added, with stirring and slight cooling to 20–30°, to a suspension of 6 g. of sodium hydride in 100 ml. of dimethylformamide. To this mixture there was then added a solution of 22.7 g. of 2,5-bis-(chloromethyl)-thiophene in 80 ml. of dimethylformamide, and the resulting mixture was permitted to stand for 12 hours at room temperature. The greater part of the dimethylformamide was then distilled off under reduced pressure, the residue poured into 1 N sodium hydroxide solution, extracted with a mixture of ether and methylene chloride, the extract washed with 1 N sodium hydroxide, dried over sodium sulfate, filtered over activated charcoal, and evaporated. The residue was recrystallized from methylene chloride/ether yielding 2,5-bis-[2-methyl-1,2-dibenzoyl - hydrazino)-methyl] - thiophene, melting at 178–179°.

60 g. of this compound in 950 ml. of ethanol was boiled for 15 hours under a nitrogen atmosphere with a solution of 100 g. of potassium hydroxide in 85 ml. of water. The reaction mixture was then concentrated under reduced pressure, the concentrate saturated with solid potassium hydroxide and treated with ether. The aqueous hydroxide was then separated, the ether phase dried over potassium hydroxide, filtered and evapoated. The residual 2,5-bis-[(2-methylhydrazino)-methyl]-thiophene, a yellowish viscous oil, boiled at 118–120°/0.02 mm. Hg.

The dihydrochloride was prepared from the above product by treatment with ethanolic hydrogen chloride, and, upon recrystallization from methanol/ether, melted at 155° (dec.).

Example 5

31.4 g. of 1-methyl-1,2-dicarbobenzoxy-hydrazine was added to a solution of 5.4 g. of sodium in 300 m. of absolute ethanol, and the resulting mixture evaporated under reduced pressure to a syrup. This was then dissolved in 120 ml. of dimethylformamide and after the gradual addition of 22 g. of 3-(chloromethyl)-pyridine hydrochloride, heated for one hour on the steam bath. The mixture was then poured ino one liter of water, the resulting oil extracted with ether, and the basic part of the ether extract removed via twice extracting with 200 ml. of 3 N hydrochloric acid. The hydrochloric acid solution was rendered alkaline with sodium hydroxide, the separated bases extracted with ether, the ether extract dried over potassium carbonate and concentrated under reduced pressure. The so-obtained intermediate was hydrogenolyzed without purification. The hydrogenolysis was effected by dissolving the product in 300 ml. of methanol and hydrogenating in the presence of palladium-carbon. After the hydrogen absorption had terminated, the catalyst was filtered off, the solution evaporated under reduced pressure, and the residue purified via fractional distillation. The so-obtained 1 - methyl-2 - (3 - pyridylmethyl)-hydrazine formed a light yellow oil which boiled at 135–140°/100 mm. Hg, and was readily soluble in water.

Example 6

The procedure described in Example 5 was followed using 22 g. of 4-(chloromethyl)-pyridine hydrochloride. After termination of the hydrogenation, the solution was evaporated under reduced pressure and the residue treated with ethanolic oxalic acid. The so-obtained 1-methyl-2-(4-pyridylmethyl)-hydrazine oxalate melted at 118–120°, and was readily soluble in water.

Example 7

The procedure described in Examples 5 and 6 was followed using 22 g. of 2-(chloromethyl)-pyridine hydrochloride. The so-obtained 1-methyl-2-(2-pyridylmethyl)-hydrazine oxalate melted at 129–130°.

Example 8

31.5 g. of 1-methyl-1,2-dicarbobenzoxy-hydrazine was added to a solution of 2.3 g. of sodium in 200 ml. of absolute ethanol, and the resulting solution evaporated under reduced pressure. The residual syrup was dissolved in 150 ml. of dimethylformamide and treated with a solution of 14.5 g. of 3,5-dimethyl-4-(chloromethyl)-isoxazole in a small amount of dimethylformamide. The reaction was exothermic and terminated after 30 minutes. The reaction mixture was then diluted with water, extracted with methylene chloride, and the methylene chloride extracts washed twice with water, dried over sodium sulfate, and evaporated under reduced pressure. The residue was purified via distillation in vacuum, yielding 1-methyl-2-[(3,5-dimethyl - 4 - isoxazolyl)-methyl] - 1,2 - dicarbobenzoxy-hydrazine as a highly viscous, yellowish oil boiling at 230–240°/0.1 mm. Hg.

32 g. of the so-obtained intermediate was poured with stirring into 120 ml. of a 33% solution of hydrogen bromide in glacial acetic acid, and the resulting mixture stirred for a further 2 hours. The reaction mixture was then evaporated under reduced pressure, the residue taken up in water and the benzyl bromide removed via extraction with ether. The aqueous solution was then concentrated under reduced pressure, the residue dissolved in absolute ethanol, and treated until turbidity with ethyl acetate. The precipitated 1-methyl-2-[(3,5-dimethyl-4-isoxazolyl)-methyl]-hydrazine hydrobromide melted at 147–148°.

Example 9

31.5 g. of 1-methyl-1,2-dicarbobenzoxy-hydrazine, 2.3 g. of sodium and 13.1 g. of 5-methyl-3-(chloromethyl)-isoxazole were reacted according to the procedure set forth in Example 8 above. The condensation product, a thick yellowish oil, boiled at 245–250°/0.1 mm. Hg. By solvolysis with hydrogen bromide-glacial acetic acid, there was obtained a non-crystallizable hydrobromide which was dissolved in water, and the bromine ion exchanged for oxalate-ion via use of an Amberlite-IRA 410 Column (oxalate form). The eluated aqueous phase was concentrated under reduced pressure, and the separated residue was recrystallized from absolute ethanol, yielding 1-methyl-2-[(5-methyl - 3 - isoxazolyl)-methyl]-hydrazine oxalate, which melted at 135–137°.

Example 10

31 g. of 1-methyl-1,2-dicarbobenzoxy-hydrazine with 17.5 g. of 3-(dimethylaminomethyl)-indole and a solution of a small amount of pulverized potassium hydroxide in 250 ml. of toluene were boiled for 48 hours under reflux. The hot toluene solution was then filtered and the filtrate twice extracted, each time with 100 ml. of 3 N hydrochloric acid, in order to remove excess 3-(dimethylaminomethyl)-indole. The toluene solution was then dried over sodium sulfate, filtered and the filtrate evaporated under reduced pressure. The residue was dissolved in 300 ml. of methanol and hydrogenated in the presence of palladium-carbon. After termination of the hydrogen absorption, the catalyst was filtered off, the residue dissolved with slight warming in 60 ml. of absolute ethanol, and ethanolic hydrochloric acid added thereto to a pH of 5, and the solution then slowly diluted with 200 ml. of ethyl acetate. After standing 12 hours in the cold, the product, 1-methyl-2-[(3-indolyl)-methyl]-hydrazine hydrochloride separated out and formed crystals melting at 125–126°.

Example 11

31.5 g. of 1-methyl-1,2-dicarbobenzoxy-hydrazine was added to a solution of 2.3 g. of sodium in 200 ml. of absolute ethanol and, after the addition of 30.3 g. of 3-(dimethylaminomethyl)-dibenzofuran methylsulfonate, the mixture was boiled for 3 hours under reflux. The at first strong dimethylamine evolution ceased in the course of this time nearly completely. The reaction mixture was then diluted with water, extracted with methylene chloride, the extract shaken with 3 N hydrochloric acid, dried over sodium sulfate, and evaporated under reduced pressure. The residue was dissolved in 300 ml. of methanol and hydrogenated in the presence of palladium-carbon. After termination of the hydrogen absorption, the catalyst was filtered off and the solution was evaporated under reduced pressure. The residue was dissolved in absolute ethanol and the solution treated with ethanolic hydrochloric acid. At a pH of 5, a chlorohydrate spontaneously precipitated. The mixture was then permitted to stand for 12 hours in the cold, during which time further crystallization occurred. The crystals were filtered off and washed with ether, yielding 1-methyl-2-[(3-dibenzofuranyl)-methyl]-hydrazine-hydrochloride, melting at 205–207°.

Example 12

To a suspension of 6 g. of sodium hydride in 100 ml. of dimethylformamide, there was added dropwise, while stirring and slightly cooling at 20–30°, a solution of 63.5 g. of 1-methyl-1,2-dibenzoyl-hydrazine in 160 ml. of dimethylformamide. Then, a solution of 26 g. of 3,4-bis-(chloromethyl) - 2,5 - dimethylthiophene in 80 ml. of dimethylformamide was added thereto and the mixture allowed to stand for 15 hours at room temperature. The major part of dimethylformamide was eliminated under reduced pressure, the residue was poured into 1 N sodium hydroxide solution, extracted with a mixture of ether and methylenechloride, the extract was washed with 1 N sodium hydroxide solution and with water, and the ether-methylene chloride phase was dried over sodium sulfate and concentrated. The residue was recrystallized from methylene chloride-ether. There was thus obtained 3,4-bis - [(2 - methyl - 1,2 - dibenzoyl - hydrazino)-methyl]-2,5-dimethyl-thiophene of melting point 198–200°. 100 g. of this intermediate product were boiled with 1500 ml. of ethanol together with a solution of 160 g. of potassium hydroxide in 137 ml. of water for 14 hours under nitrogen. The reaction mixture was then concentrated under reduced pressure, the concentrate saturated with solid potassium hydroxide and extracted with ether. After elimination of the aqueous potassium hydroxide solution, the ether phase was dried over potassium hydroxide and fractionated in vacuo. There was thus obtained 3,4-bis-[(2 - methyl - hydrazino) - methyl] - 2,5 - dimethyl-thiophene as yellowish viscous oil of boiling point 130°/0.1 mm. Hg. The dihydrochloride prepared therefrom by means of alcoholic hydrochloric acid melted at 225–225½° after recrystallization from methanol-ether.

Example 13

26 g. of 5 - [(2 - methyl - 1,2 - dicarbobenzoxy - hydrazino) - methyl] - thiophene - 2 - carboxylic acid were refluxed for 2 hours with 100 ml. of benzene and 15 ml. of thionyl chloride. The excess thionyl chloride and the benzene were distilled off in vacuo and the residue was again concentrated twice in vacuo with 100 ml. of absolute benzene each time. The 5 - [(2 - methyl - 1,2 - dicarbobenzoxy - hydrazino) - methyl] - thiophene - 2 - carboxylic acid chloride thus obtained as a yellowish viscous oil was dissolved in 100 ml. of methylene chloride and slowly reacted, while stirring and cooling with ice water, with a solution of 11 ml. of isopropylamine and 50 ml. of methylene chloride. Then, the solution was allowed to stand for 15 hours at room temperature, poured then on about 200 ml. of water, 500 ml. of ether were added thereto and the mixture was well shaken. The organic phase was separated, washed with water, 1% sodium carbonate solution and again with water, and dried over sodium sulfate. The filtered solution was concentrated in vacuo and there was thus obtained 1 - methyl - 2 - [5-isopropyl - carbamoyl) - 2 - thenyl]1,2 - dicarbobenzoxy-hydrazine as a yellow-brown viscous oil. This was dissolved in 20 ml. of glacial acetic acid and reacted with 100 ml. of a 33% solution of hydrobromic acid in glacial acetic acid. After 3 hours standing at room temperature, 1 liter of absolute ether was added, the solution decanted from the viscous oil that separated, the lateer was dissolved in 50 ml. of water and the aqueous solution extracted with 500 ml. of ether The aqueous phase was separated, treated with solid potassium carbonate under nitrogen and while cooling with ice until completely saturated and extracted with methylene chloride.. The methylene chloride extract was dried with potassium carbonate and concentrated in vacuo, the residue dissolved in 50 ml. of isopropanol and treated with one equivalent of alcoholic hydrochloric acid. The 1 - methyl - 2 - [5-isopropylcarbamoyl) - 2 - thenyl] - hydrazine hydrochloride crystallized from the solution on standing. Melting point 141–143° after recrystallization from methanol-ether.

The acid used as starting material was obtained as follows: To a suspension of 13.5 g. of sodium hydride in 50 ml. of dimethylformamide were added dropwise, while stirring and slight cooling at 20–30°, a solution of 177 g. of 1 - methyl - 1,2 - dicarbobenzoxy - hydrazine in 150 ml. of dimethylformamide. As soon as the evolution of hydrogen was over and the solution complete, there was added dropwise a solution of 102.5 g. of 5 - (chloromethyl)-thiophene-2-carboxylic acid methyl ester in 60 ml. of dimethylformamide, whereby the temperature was kept under 30° by cooling. Stirring was then continued for 3 more hours at room temperature, the reaction mixture poured on two liters of ice water and extracted with ether. The ether extract was concentrated and the residue dissolved in 400 ml. of dioxane and stirred for 15 hours at room temperature with a solution of 22 g. of sodium hydroxide in 150 ml. of water. The mixture was then poured onto about two liters of water and the unsaponifiable substance was extracted with ether. The aqueous phase was made slightly acidic to Congo red by means of concentrated hydrochloric acid and the acid that precipitated was extracted with ether. The ether extract was washed neutral with water, dried over sodium sulfate, then concentrated. There was thus obtained 5-[(2-methyl-1,2 - dicarbobenzoxy - hydrazino)-methyl] - thiophene-2-carboxylic acid as yellowish viscous oil, which was pure enough for further reaction.

*Example 14*

6 g. of urea, 47.3 g. of 5 - [(2 - methyl - 1,2 - dicarbobenzoxy - hydrazino) - methyl] - thiophene - 2 - carboxylic acid chloride, 8 g. of pyridine and 200 ml. of benzene were mixed and boiled for 8 hours while stirring. The mixture was cooled, poured into water and extracted with an ether-methylene chloride mixture. The extract was washed with water, 1% hydrochloric acid, 1% sodium carbonate solution and again with water, dried over sodium sulfate, and the solvent was distilled off. The residual 1 - methyl - 2 - (5 - allophanoyl - 2 - thenyl)-1,2 - dicarbobenzoxy - hydrazine, as a viscous yellow oil, was dissolved in 30 ml. of glacial acetic acid and treated with 100 ml. of a 33% solution of hydrobromic acid in glacial acetic acid. After 3 hours standing, the dihydrobromide of 1 - methyl - 2 - (5 - allophanoyl - 2 - thenyl)-hydrazine that crystallized out was filtered off and washed with glacial acetic acid-ether (4:1) and with ether.

*Example 15*

25 g. of 5-[(2-methyl-1,2-dicarbobenzoxy-hydrazino)-methyl]-furan-2-carboxylic acid were transformed into their acid chloride in the same way as thiophene-2-carboxylic acid (Example 13). The acid chloride thus obtained was likewise reacted with isopropylamine to obtain 5 - methyl-2-[5-isopropylcarbamcyl)-2-furfuryl]1,2-dicarboxybenzoxy-hydrazine. The intermediate substance thus obtained was dissolved in 250 ml. of methanol and decarbobenzoxylated by shaking in hydrogen atmosphere in the presence of palladium-carbon. Once the reaction was over, there was added one equivalent of alcoholic hydrochloric acid, the catalyst filtered off and the filtrate concentrated. On treating the concentrate with acetonitrile and ether, there was obtained a crystalline precipitate consisting of 1-methyl-2-[5-(isopropylcarbamyl)2-furfuryl]-hydrazine hydrochloride melting at 121–123°.

The acid used as starting material was obtained in a similar way as thiophene-2-carboxylic acid (Example 13) starting from 5-(chloromethyl)-furan-2-carboxylic acid methyl ester.

*Example 16*

40 g. of 5-[(2-methyl-1,2-dicarbobenzoxy-hydrazino)-methyl]-thiophene-2-carboxylic acid chloride were dissolved in 100 ml. of ether and added dropwise during 1 hour, while stirring at 0–5°, to 100 ml. concentrated aqueous ammonia. Stirring was continued for 15 more hours at 0–5°, the reaction mixture poured onto 1 liter of ether, the aqueous layer was separated and the ether phase washed with water, 1% hydrochloric acid, 1% sodium carbonate solution and again with water. After drying with sodium sulfate, the ether was distilled off and the residue dissolved in 30 ml. of glacial acetic acid and reacted with 140 ml. of a 33% solution of hydrobromic acid in glacial acetic acid. The solution was allowed to stand for 2 hours, whereupon the crystallized product was filtered off and washed with glacial acetic acid and with ether. There was thus obtained 1-methyl-2-(5-carbamoyl-2-thenyl)-hydrazine dihydrobromide.

*Example 17*

320 g. of 5-[(2-methyl-1,2dicarbobenzoxy-hydrazino)-methyl]-thiophene-2-carboxylic acid were dissolved in 320 ml. of absolute benzene and refluxed for 2 hours with 76 ml. of thionyl chloride. Then, the reaction mixture was concentrated in vacuo and distilled twice with 250 ml. of benzene each time until all excess thionyl chloride was eliminated. Then, the viscous oily residual acid chloride was dissolved in acetone and added dropwise to a solution of ammonium rhodanide in acetone, whereby ammonium-chloride immediately precipitated. Then, the mixture was heated for 5 minutes to the boil, the precipitated salt filtered off and the filtrate concentrated in vacuo. The residue, containing the corresponding acyl isocyanate, was dissolved in absolute benzene and saturated with gaseous ammonia. The reaction mixture was boiled for a short while and again cooled down, washed with water and concentrated in vacuo. There was thus obtained about 400 g. of 5-[(2-methyl-1,2-dicarbobenzoxy-hydrazino)-methyl]-thiophene-2-carbonyl-thiourea, which were dissolved in 700 ml. of a 30% solution of hydrobromic acid in glacial acetic acid. The evolution of carbon dioxide started immediately and after some time a yellow precipitate formed. After standing overnight at room temperature, the precipitate was sucked off, washed at first with glacial acetic acid, then with ether, and finally recrystallized from isopropanol. There was thus obtained 5-[(2-methyl-hydrazino) - methyl] - thiophene-2-carbonyl-thiourea as cream-coloured powder melting at 195–197° (dec.).

We claim:

A compound selected from the group consisting of 1-methyl-2-(pyridylmethyl)-hydrazine and pharmaceutically acceptable acid addition salts thereof.

References Cited

UNITED STATES PATENTS

| | | | |
|---|---|---|---|
| 2,420,702 | 5/1947 | Drewitt et al. | 260—569 |
| 2,927,111 | 3/1960 | Biel | 260—583 X |
| 2,930,795 | 3/1960 | Biel | 260—313 |
| 3,051,707 | 8/1962 | Biel | 260—583 X |
| 3,073,819 | 1/1965 | Straub et al. | 260—296 |

OTHER REFERENCES

Green: The Biochemical Journal, volume 84, No. 1, July 1962, pp. 217–223.

WALTER A. MODANCE, *Primary Examiner.*

IRVING MARCUS, NICHOLAS S. RIZZO, *Examiners.*

ROBERT T. BOND, M. W. WESTERN, *Assistant Examiners.*

UNITED STATES PATENT OFFICE
CERTIFICATE OF CORRECTION

Patent No. 3,330,837                  July 11, 1967

Werner Bollag et al.

It is hereby certified that error appears in the above numbered patent requiring correction and that the said Letters Patent should read as corrected below.

Column 6, line 11, "methyldrazinomethyl-" should read -- methylhydrazinomethyl- --; line 64, "20-20°" should read -- 20-30° --. Column 7, line 7, "sautrated" should read -- saturated --. Column 8, line 22 "[2-methyl" should read -- [(2-methyl --; line 31, "evapoated" should read -- evaporated --; line 48, "ino" should read -- into --; line 65, "100 mm. Hg" should read -- 10 mm. Hg --. Column 11, line 6, "isopropyl-" should read -- (isopropyl- --; line 12, "lateer" should read -- latter --; line 14, "ether The" should read -- ether. The --; line 22, "isopropylcarbamoyl)" should read -- (isopropylcarbamoyl) --. Column 12, line 8, "5-isopropylcarbamcyl)" should read -- 5-(isopropylcarbamoyl) --; line 9, "dicarboxybenzoxy" should read -- dicarbobenzoxy --; line 17, "(isopropylcarbamyl)" should read -- (isopropylcarbamoyl) --; line 45, "1,2dicarbobenzoxy-" should read -- 1,2-dicarbobenzoxy- --.

Signed and sealed this 21st day of October 1969.

(SEAL)
Attest:

EDWARD M. FLETCHER, JR.
Attesting Officer

WILLIAM E. SCHUYLER, JR.
Commissioner of Patents